United States Patent [19]

Muyskens

[11] Patent Number: 4,542,908
[45] Date of Patent: Sep. 24, 1985

[54] SLALOM SLED ARRANGEMENT

[76] Inventor: John R. Muyskens, 74 E. 16th St., Holland, Mich. 49423

[21] Appl. No.: 410,334

[22] Filed: Aug. 23, 1982

[51] Int. Cl.[4] ............................................. B62B 13/12
[52] U.S. Cl. .............................. 280/21 A; 280/12 AA
[58] Field of Search ................ 280/21 A, 21 R, 22, 280/26, 27, 16, 12 AA, 12 AB, 17, 87.01

[56] References Cited

U.S. PATENT DOCUMENTS

| 1,600,735 | 9/1926 | Pederson | 280/21 A |
|---|---|---|---|
| 2,357,928 | 9/1944 | Bowen | 280/21 A |
| 2,547,210 | 4/1951 | Holbrook | 280/21 A |
| 2,666,652 | 1/1954 | Lammers | 280/21 A |
| 3,370,862 | 2/1968 | Huffnagle | 280/21 R |
| 4,336,950 | 6/1982 | Zepkowski | 280/21 A |

Primary Examiner—Joseph F. Peters, Jr.
Assistant Examiner—Joseph G. McCarthy
Attorney, Agent, or Firm—Varnum, Riddering, Schmidt & Howlett

[57] ABSTRACT

A slalom sled arrangement (100) is disclosed for use by a sled rider for traversing through snow. The slalom sled includes a pair of skis (108) and a sled platform (102) mounted on the skis by means of forward and rear support assemblies (112, 114). Each support assembly includes a pivot position which allows the skis to rotate in a limited manner about longitudinal axes relative to a horizontal plane defined by the sled platform. Steering means (200, 220) are connected to the skis through a rod and bar assembly (160, 170) which allows the rider to manually and selectively control the skis in a simultaneous or independent manner.

20 Claims, 18 Drawing Figures

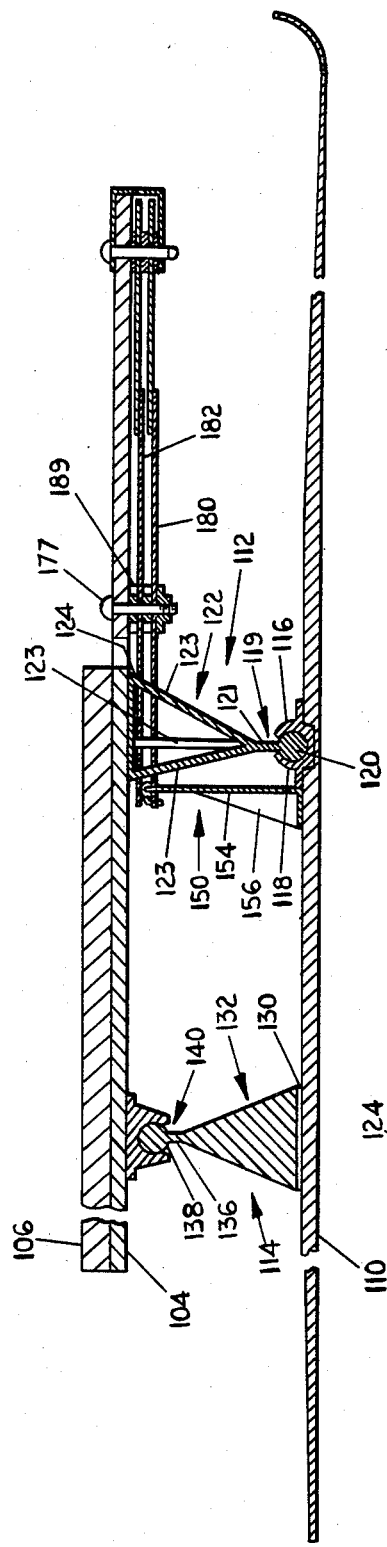
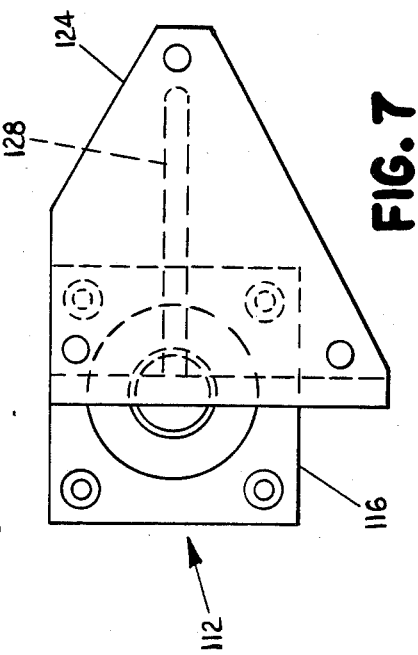
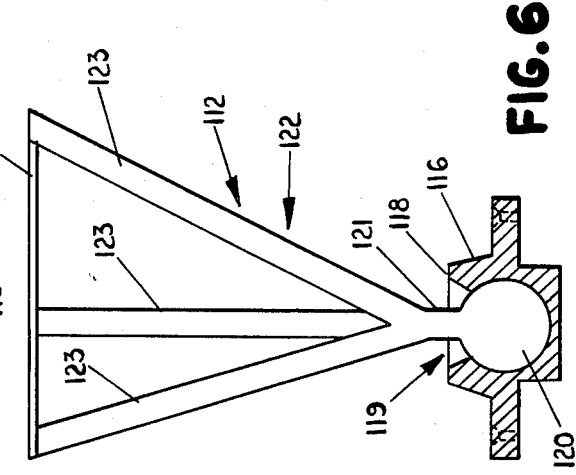

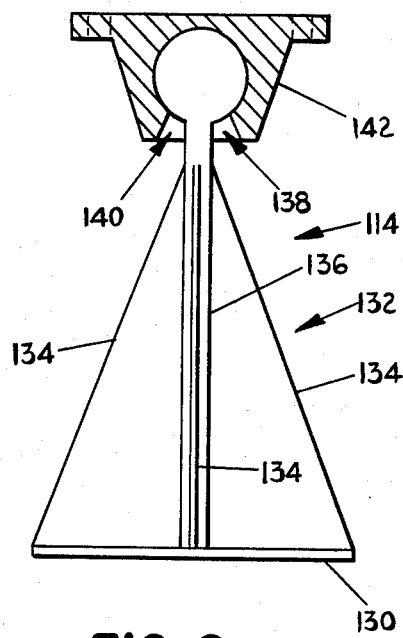
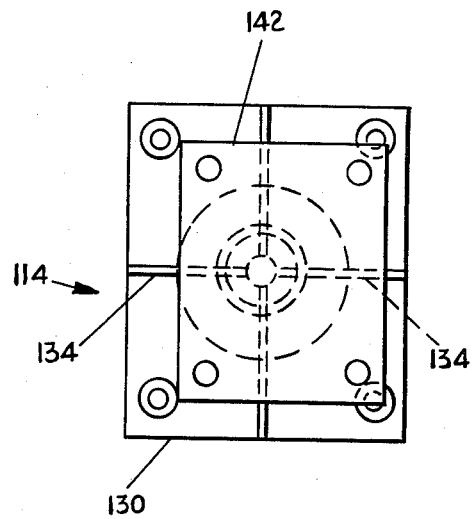
FIG.8
FIG.9
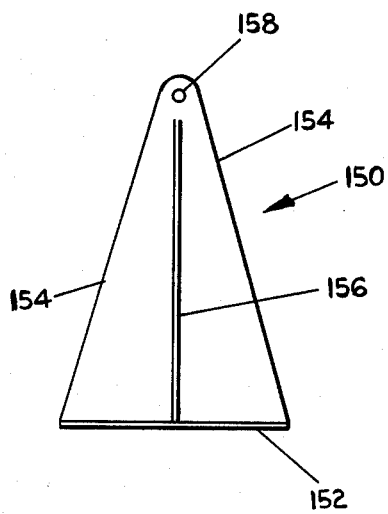
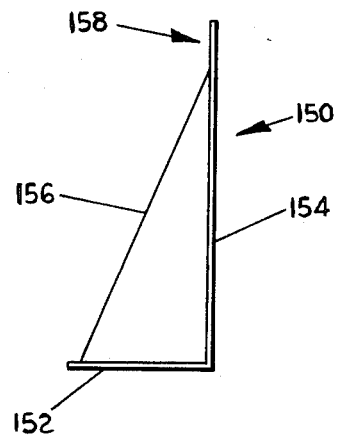
FIG.10
FIG.11

SLALOM SLED ARRANGEMENT

DESCRIPTION

1. Technical Field

This invention relates to ski supported vehicles and, more particularly, relates to a slalom sled arrangement having manually controllable means for steering and braking the sled arrangement.

2. Background Art

Various types of sled-type vehicles adapted for use on snow are commercially available to the public for purposes of general recreation and emergency use in geographical areas inaccessible to conventional emergency vehicles. The principles of operation and general concepts of such sled-type vehicles have been long known throughout history.

All of the various types of commercially available sled-type vehicles commonly employ the concept of a means to facilitate movement across snow. Simple sled vehicles now exist which consist of little more than a "dish-shaped" portion having a lower exterior which presents a relatively frictionless surface to snow. However, such simple sled arrangements are somewhat uncomfortable for the sled rider and are difficult to control in that they have no means to steer the vehicle, other than physical body movement to maneuver the position of the rider's center of gravity. Furthermore, such vehicles do not include any means for stopping movement other than by mere gravitational effects and relative friction between the snow and the dish.

Other types of commercially available sled vehicles well-known in the art include a substantially flat platform on which the rider can position himself in various configurations (prone, sitting upright, etc.) and include two or more "runners" typically constructed of metal. Many of these types of sled vehicles also do not provide any means for steering or braking but are substantially more comfortable than dish-shaped sled vehicles and afford less friction and, thus, more rapid movement through snow.

However, others of these sled vehicles with runners include various means for steering the vehicles through snow. For example, the Bjork U.S. Pat. No. 3,366,395 discloses a sled arrangement having a platform, a single front runner and a pair of parallel rear runners. Steering of the front runner is accomplished by means of a single handlebar rotational about a vertical axis and connected to the front runner, which is correspondingly rotational about a similar vertical axis. The rear runners are, in turn, interconnected to the front runner by means of linkage bars. Lateral rotation of the front runner in a particular direction by manual manipulation of the handlebar causes simultaneous turning of the rear runners but in an opposing direction, with the rear runners being maintained in the same relative parallel spatial relationship at all times.

However, the steering arrangement described in the Bjork patent does not provide a substantial means for braking the sled vehicle when the rider desires to stop. In addition, runners can be disadvantageous in loosely packed snow or snow "powder". That is, due to the runners' narrow width and substantial weight, they tend to penetrate loose snow, thereby impeding movement of the sled vehicle.

Other commercially available sled vehicles utilize "skis" instead of runners to facilitate movement in loose snow, since they present a greater width and less mass density to the snow. Several of these ski sled arrangements also include various types of steering mechanisms manually controllable by the sled rider.

One early disclosure of a "ski-type" sled arrangement is described in the to Lammers et al U.S. Pat. No. 2,666,652. The sled described therein includes a pair of ski runners attached to a sled body with cross-members connected to lower V-shaped supports secured to hinge plates. Other hinge plates provide a "piano-hinge" arrangement which allows a pivoting movement of the skis in response to manual manipulation of a single steering bar.

Still other ski sled arrangements employ steering mechanisms adapted to provide not only pivoting of the skis relative to the main body of the sled, but effective braking by allowing a "snow plow" configuration of the skis. Essentially, the known ski-type sled inventions differ from each other in their particular ski configuration, steering mechanisms and interface between the sled rider and the steering mechanism.

For example, the Huffnagle U.S. Pat. No. 3,370,862 includes a horizontal platform supported by a pair of skis connected to the lower surface of the platform through front and rear bracket support assemblies. Each front support assembly (one for each of the right- and left-hand skis, respectively) includes a V-shaped bracket rigidly connected to the platform at its upper portion and having a ball and socket arrangement near its lower portion. The ball and socket arrangement connects an upper bracket of the support assembly to a lower bracket which is rigidly connected to the ski.

Each rear support assembly also includes a bracket rigidly connected to the platform undersurface but further includes a sleeve extending upwardly from the bottom end of the bracket and a shaft rotatably mounted through the sleeve. The lower end of the shaft is connected to the upper portion of an arm which is inclined rearwardly and downwardly, and is connected at its bottom end to a post. The post includes a ball which fits within a cylindrical sleeve attached to the upper surface of the ski. The axis of the sleeve is parallel to the longitudinal axis of the ski. In accordance with its arrangement, rotation of the shaft causes the arm to correspondingly rotate with translational movement of the rearward portion of one of the skis. Each of the left-hand and right-hand skis includes front and rear support assemblies corresponding to the mechanisms described above.

The steering assembly of the ski sled described in the Huffnagle patent includes a horizontal arm which is rotatably connected to the upper end of the shaft. The other end of the arm is pivotally joined by a pin to a rod which extends to the left-hand portion of the handlebar. The rod and the left handlebar portion are connected by means of a pivot pin. A similar steering assembly is connected between the other ski and the right-hand handlebar portion.

In operation, steering of the sled is accomplished by pulling downwardly on either the left-hand or right-hand portion of the handlebar assembly. For example, as the left-hand portion is pulled downwardly, it pivots about the pin to rotate the right-hand ski for purposes of accomplishing a left turn. The movement of the handle portion causes the rod to push on the arms so as to rotate the arm counterclockwise and, correspondingly, rotates the vertical shaft to cause the lower arm to turn with the upper arm. Acting simultaneously in this manner, the arms, together with the shaft, form a bell-crank arrangement. As a result of the rotation of the arm, the rear portion of the particular ski associated with the portion of the handlebar assembly operated by the sled rider is turned outwardly away from the longitudinal axis of the sled.

Simultaneously, the forward part of the particular ski pivots about the ball and socket arrangement in a plane substantially parallel to the sled platform. The ski is also tilted as the steering occurs. The steering force, being applied to the rearward portion of the ski where the ball is within the sleeve, is applied at a position lower than the ball and socket joint where the forward portion of the ski attaches to the platform.

The ski sled disclosed in the Huffnagle patent also includes a stop which provides for a limiting movement of the handlebar portions when they are returned to their normal position. Furthermore, the handlebar portions can be pulled downwardly simultaneously to cause both of the skis to pivot in a "snow plow" or braking arrangement.

Several of the known ski sled arrangements, including those described in the Huffnagle patent, provide also for "tilting" of the skis to improve turning and braking capabilities. However, many of these arrangements have fairly complex mechanisms for interfacing the steering and braking operations of the skis to manual control by the sled rider. The complexity of these mechanisms leads to greater initial and maintenance costs, and also to higher breakdown probabilities.

In addition, ski sled arrangements comparable to those described in the Huffnagle patent provide rotational movement of only one ski during execution of a turn. Accordingly, the other ski remains parallel to the sled platform and reduces momentum necessary to effect a turn, thereby reducing turning efficiency. Furthermore, during braking and turning operations, sleds in accordance with those described in the Huffnagle patent require the rider to "pull" rearwardly on portions of the handlebar assembly. The rearward pulling causes difficulty in maintaining body position on the sled platform and control of the sled in general, since the rider is applying forces to the sled which directionally oppose sled momentum.

DISCLOSURE OF THE INVENTION

Advantageously, a slalom sled arrangement for use by a sled rider and adapted to be controllable by the rider for turning and braking operations comprises platform means for providing a seating location for the rider and includes ski means mounted beneath the platform means for providing sliding surfaces to the arrangement and traversing through snow by gravitational effects. A forward support means connected between the platform means and the ski means is utilized to support the platform means above the ski means and is positioned at a location forward of a longitudinal center point of the ski means. Rear support means are also connected between the platform means and the ski means to provide additional support to the platform means above the ski means and are positioned at a location rearward of a longitudinal center point of the ski means. In accordance with the invention, the forward support means comprises first pivot means for providing pivotal movement of the ski means relative to the platform means, wherein the first pivot means comprises a pivot center below a vertical midpoint between the platform means and the ski means. Further in accordance with the invention, the rear support means comprises second pivot means for providing additional pivotal movement of the ski means relative to the platform means, wherein the second pivot means comprises a pivot center above a vertical midpoint between the platform means and the ski means.

The ski means comprises a pair of skis each mounted on opposing lateral sides of the sled arrangement and the forward support means includes a pair of bracket assemblies vertically disposed between the ski means and the platform means, wherein each of the bracket assemblies is mounted between one of the skis and the platform means. Each of the forward bracket assemblies includes a base portion mounted to one of the pair of skis with the first pivot means comprising a ball and socket arrangement mounted into each of the base portions. The rear support means comprises a pair of vertically disposed rear bracket assemblies, each mounted between one of the skis and the platform means, wherein the second pivot means includes a pair of ball and socket arrangements each mounted to one of the rear bracket assemblies adjacent to the platform means.

In accordance with the invention, the sled arrangement further comprises steering means connected to the ski means for manually controlling direction and braking of the sled arrangement by the rider. The steering means is adapted to manual control by the rider so as to allow selective turning of the ski means relative to the platform means to provide a turning function of the arrangement, and to further allow the rider to operate the ski means so as to provide a braking function for stopping the sled arrangement. The steering means includes control means manipulable by the rider for selectively and independently controlling pivotable movement of each of the skis, and further comprises locking means manipulable by the rider for controlling pivotal movement of the skis in a manner so as to effect a simultaneous turning operation of the skis.

BRIEF DESCRIPTION OF DRAWINGS

A preferred embodiment of the invention will now be described with reference to the drawings in which:

FIG. 3 is a side sectional view of the sled arrangement depicted in FIG. 1 and taken along lines 3—3 of FIG. 2;

FIG. 6 depicts a longitudinal end view of a forward bracket support assembly of the sled arrangement depicted in FIG. 1;

FIG. 7 depicts a plan view of the forward bracket support assembly depicted in FIG. 6;

FIG. 8 depicts a longitudinal end view of the rear bracket support assembly of the sled arrangement depicted in FIG. 1;

FIG. 9 depicts a plan view of the rear bracket support assembly depicted in FIG. 8;

FIG. 10 depicts a longitudinal end view of a steering assembly bracket of the sled arrangement depicted in FIG. 1;

FIG. 11 depicts a side view of the steering assembly bracket depicted in FIG. 10;

BEST MODE FOR CARRYING OUT THE INVENTION

Figure 1:
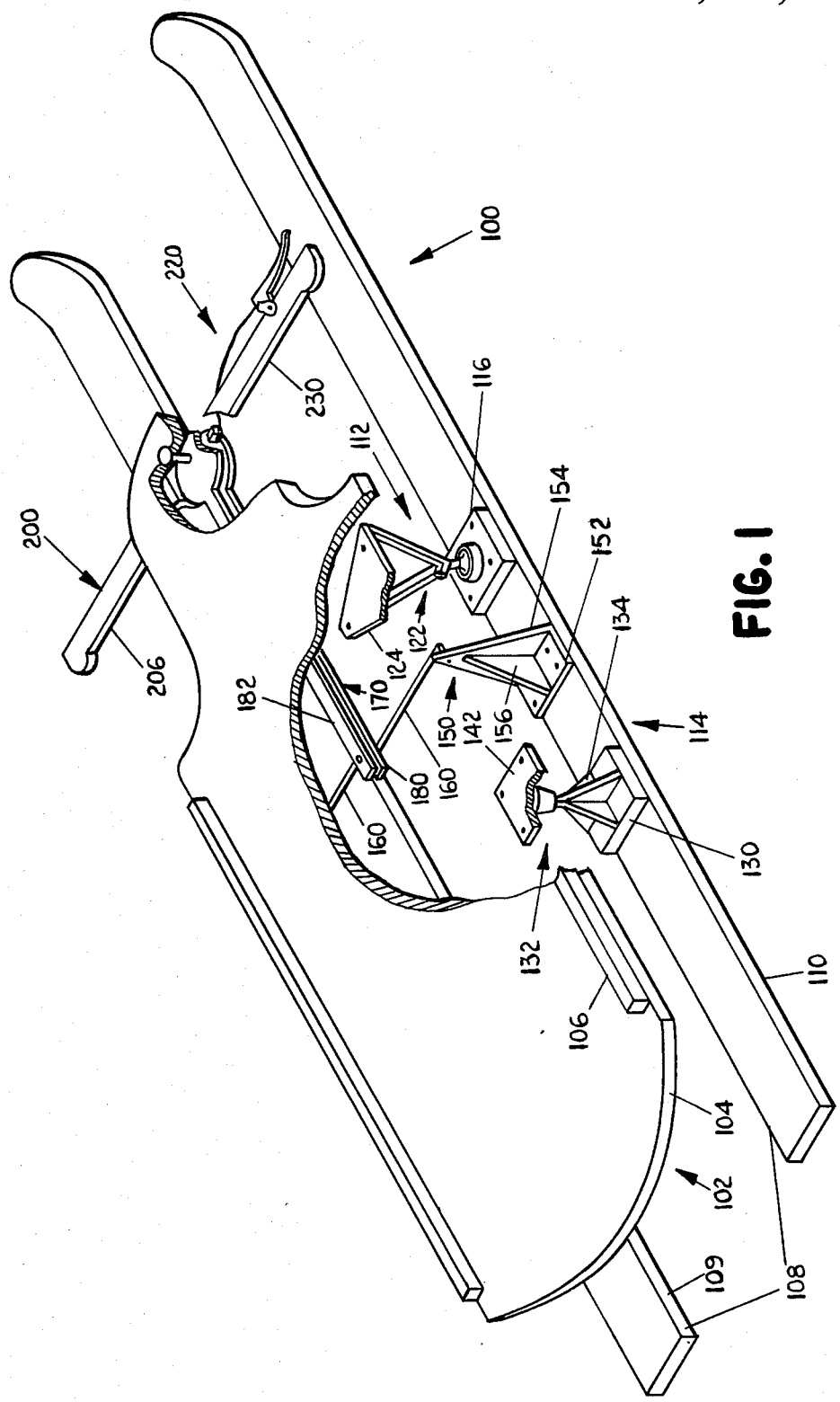
FIG. 1 is a partially cut-away perspective view of one embodiment of a slalom sled arrangement in accordance with the invention.

The principles of the invention are disclosed, by way of example, in a slalom sled arrangement 100 depicted in FIG. 1. The arrangement 100 is adapted to provide an efficient means for controlling both directional guidance and braking operations through control means manually manipulable by a sled rider.

Figure 2:
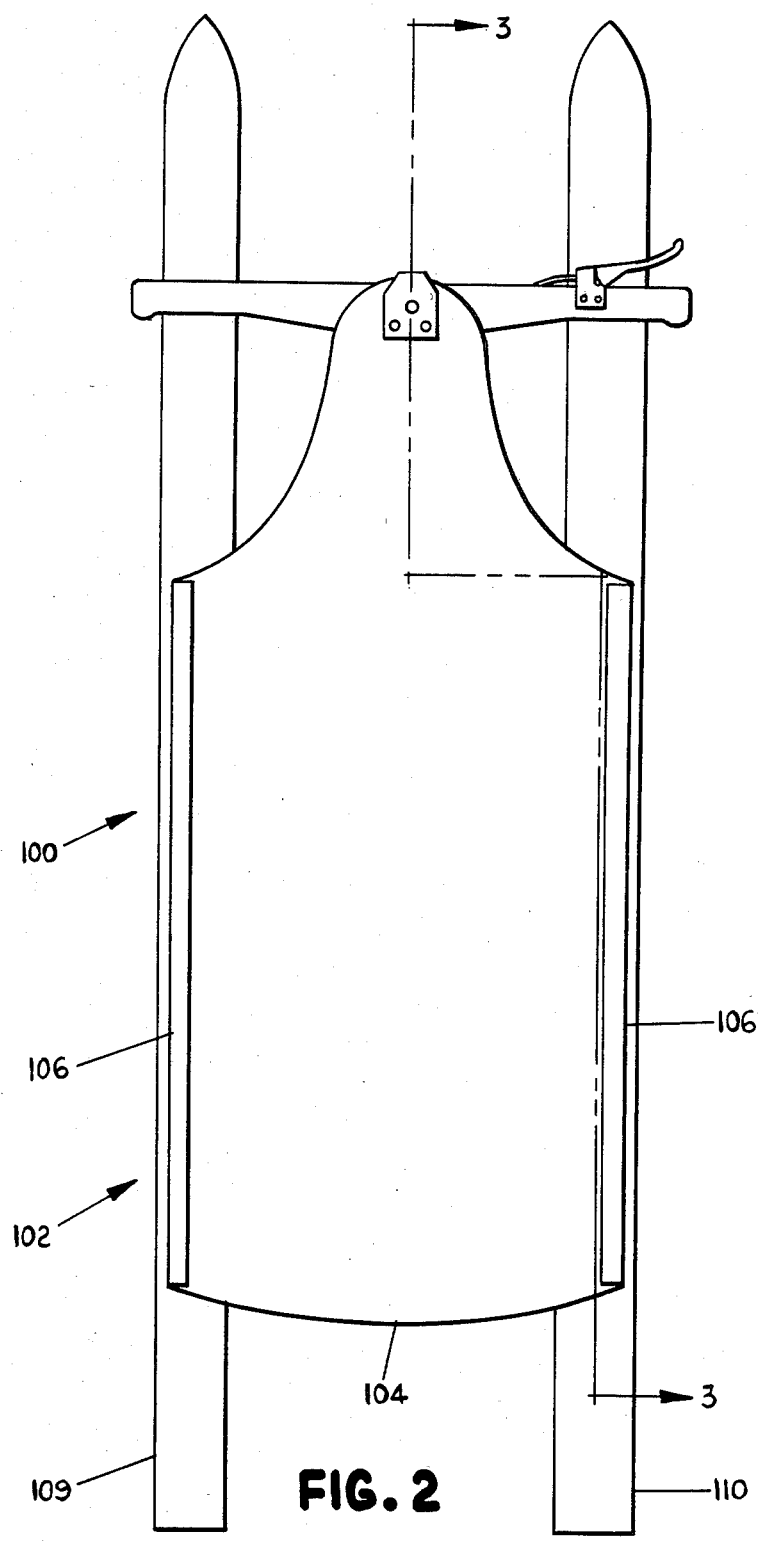
FIG. 2 is a plan view of the sled arrangement depicted in FIG. 1 showing the platform and steering bar configuration.

The main portions of the sled arrangement 100 will now be described with respect to FIGS. 1-3. As depicted perspectively in FIG. 1, the sled arrangement 100 comprises a horizontally disposed sled platform 102 having a relatively narrow height and a peripheral configuration as specifically depicted in the plan view of FIG. 2. The platform 102 comprises a base portion 104 which can, for example, be preferably constructed of a solid wood material. The platform 102 additionally comprises a pair of struts 106 disposed longitudinally on the upper surface of the base portion 104 and positioned on each of the lateral sides thereof. A sled rider will typically position himself in a prone position (facing forward on his stomach) on the platform 102. The struts 106 provide a support to the sled arrangement 100, a solid-material depth if necessary to utilize connecting means such as screws, and a partial side structure to somewhat limit movement of a sled rider positioned on the base portion 104 of the platform 102.

In accordance with the invention, the sled arrangement 100 includes a pair of skis 108 longitudinally disposed below the horizontal platform 102 and essentially parallel thereto. For purposes of description, the skis 108 are hereinafter sometimes referred to as comprising a left-hand ski 109 and a right-hand ski 110, corresponding to the positions of the ski 108 as depicted in the plan view of FIG. 2. Each of the skis 108 can be a conventional ski commercially available to the public. Skis 108 can be of any suitable length and can, for example, be approximately 58 inches in length with the platform 102 being approximately 42 inches in length.

The skis 108 are connected to the horizontally disposed platform 102 by means of bracket assemblies which are designated herein as a pair of forward bracket support assemblies 112 and a pair of rear bracket support assemblies 114. As depicted in the plan view of FIG. 4 with the sled platform 102 shown in phantom configuration, one of the forward bracket support assemblies 112 is connected to the left-hand ski 109 while, correspondingly, the other of the forward bracket support assemblies 112 is connected to the right-hand ski 110.

Figure 4:
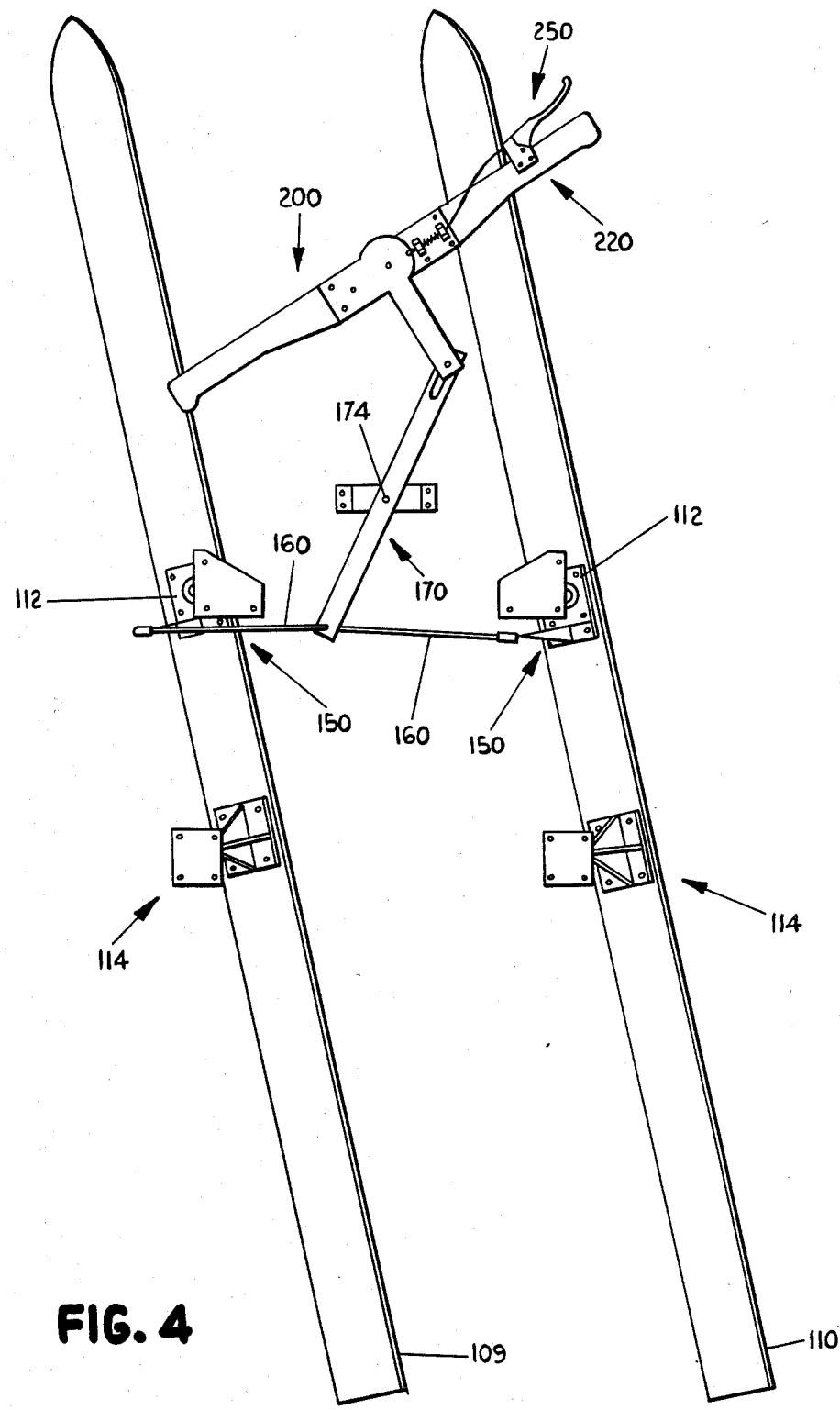
FIG. 4 is a plan view of the sled arrangement depicted in FIG. 1 with the platform shown in dotted lines and the sled configured for a left turn.

Similarly, and as also depicted in the plan view of FIG. 4, one of the rear bracket support assemblies 114 is connected to the left-hand ski 109 while, correspondingly, the other of the rear bracket support assemblies 114 is connected to the right-hand ski 110.

The bracket support assemblies 112 and 114 are utilized in accordance with the invention to vertically support the sled platform 102 a predetermined distance above the skis 108 and to provide turning and braking operations in a manner so as to allow the skis 108 to pivot about longitudinal axes directional in accordance with the direction of the skis and to further provide lateral movement of the skis relative to the sled platform 102. Details of the forward bracket support assemblies 112 and rear bracket support assemblies 114 are described in greater detail in subsequent paragraphs.

A longitudinal end view of the forward bracket support assembly 112 associated with right-hand ski 110 is depicted in greater detail in FIG. 6. Correspondingly, FIG. 7 depicts a plan view of the equivalent forward bracket support assembly 112. As depicted therein, the assembly 112 comprises a lower base portion 116 which is mounted by means of screws or other suitable connecting means directly to the right-hand ski 110. The relative structural relationship between the forward support assembly 112 and the right-hand ski 110 is also depicted in the side sectional view of FIG. 3. The base portion 116 includes a cylindrically shaped area configured by an upper protrusion of the base portion 116 and designated portion 118. Within the portion 118 is a spherical shaped area 119 which comprises a socket area hereinafter designated as socket area 119. Positioned into the socket area 119 is a spherical ball 120, the combination of which form a conventional ball and socket arrangement. Integrally connected at the upper portion of the ball 120 is a circular rod portion 121 which, in turn, is connected to a bracket support section 122 which forms a triangularly shaped section having three radially extending portions 123 which are interconnected and, in turn, terminate at a horizontally disposed upper bracket 124 which is laterally offset inwardly from the lower base bracket 116 as made apparent from the plan view of FIG. 7. The bracket 124 is, in turn, connected (by any suitable connecting means such as screws) to the lower surface of the base portion 104 of the horizontally disposed platform 102. In accordance with the invention, the ball and socket arrangement comprising ball 120 and socket 119 comprises a means for providing pivotal movement of the right-hand ski 110 about a longitudinal axis along the length portion of the ski 110. Further in accordance with the invention, the pivot "point" provided by ball 120 and socket 119 is adjacent to ski 110 and substantially below a vertical midpoint between the platform 102 and ski 110. In addition, the ball and socket arrangement provides a means for limited lateral rotation of ski 110 relative to platform 102.

The details of the rear bracket support assembly 114 connected to the horizontally disposed platform 102 and associated with the right-hand ski 110 will now be described with respect to the sectional view of FIG. 3 and the detailed end and plan views of FIGS. 8 and 9, respectively. The rear bracket support assembly 114 connected to the right-hand ski 110 comprises a horizontally disposed base portion 130 which is connected by means of screws or other suitable connecting means directly to the ski 110. The base portion 130 is rectangular in shape and integrally connected thereto is a vertical portion 132 which is best viewed and understood in accordance with the perspective view of FIG. 1. The vertical portion 132 comprises four radially extending flanges 134 each extending at relative angles of 90° with respect to adjacent flanges and formed whereby two of the flanges 134 are in a plane formed in a manner along the longitudinal axis of the ski and perpendicular with respect to the upper horizontal surface of ski 110. The flanges 134 have a right triangularly shaped configuration and terminate near the horizontally disposed platform at an apex formed by the flanges 134. A cylindrical portion 136 vertically extends from the base portion 132 upwardly towards the platform 102 and terminates in a ball 138 which is journalled into a socket 140 formed by an upper bracket portion 142 having a shape similar but inverse to the shape of the previously described base portion 116 with respect to the forward bracket assemblies 112.

The upper bracket portion 142 is connected by means of bolt or other suitable connecting means to the lower surface of the base portion 104 of the horizontally disposed platform 102. In accordance with the invention, the ball and socket arrangement formed by ball 138 and socket 140 provides a pivot point adjacent to the sled platform 102 and substantially above a vertical midpoint between the sled platform 102 and the right-hand ski 110. The pivot point formed by the ball 138 and the socket 140 provides a means for the rear support assembly 114 to pivot the ski 110 about a longitudinal axis corresponding to the direction thereof and to further provide a means for laterally rotating the ski 110 relative to the platform 102.

The forward bracket support assembly 112 and the rear bracket support assembly 114 connected to the left-hand ski 109 correspond in structure to the assemblies 112 and 114 previously described herein and connected between the sled platform 102 and the right-hand ski 110, with the distinction that the assemblies 112 and 114 associated with the left-hand ski 109 are "mirror" images in configuration with respect to the previously described assemblies.

The steering assembly for the sled arrangement 100 in accordance with the invention will now be described with respect to FIGS. 1–5 and 10–18. As specifically depicted in FIG 1, the steering assembly comprises a pair of steering brackets 150, with one of the pair of brackets 150 being selectively connected to the left-hand ski 109 and the other of the pair connected to the right-hand ski 110. Each of the brackets 150 is identical to the other of brackets 150.

A longitudinal end view of one of the steering brackets 150 is depicted in FIG. 10. For purposes of understanding and simplicity, the steering assembly, including one of the brackets 150, will be described only with respect to the right-hand ski 110. As depicted in FIG. 10, one of the steering brackets 150 comprises a rectangular base portion 152 connected to the ski 110 by means of screws or other suitable connecting means. Integral with the base portion 152 is an equilaterally shaped and vertically disposed triangular portion 154 having its base integral with base portion 152 and extending transversely across the ski 110. integral with the triangular portion 154 and perpendicularly disposed with respect thereto in a plane defined by the longitudinal axes of the ski and also perpendicularly disposed relative to the ski 110 is a right triangular portion 156.

Triangular portion 156 provides a strength support to the steering bracket 150. At the apex of the equilaterally shaped portion 154 is an aperture 158 for receiving a knuckle portion of a steering rod assembly as subsequently described herein.

Figure 12:
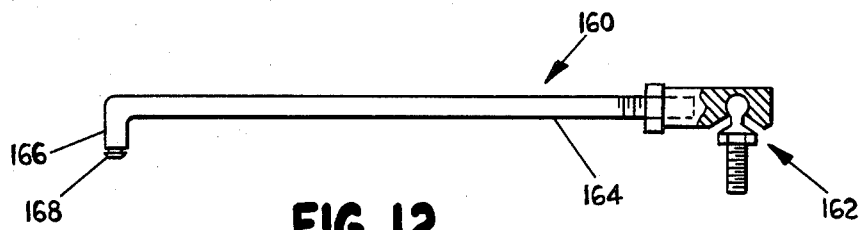
FIG. 12 depicts a steering rod of the sled arrangement depicted in FIG. 1.
Figure 13:
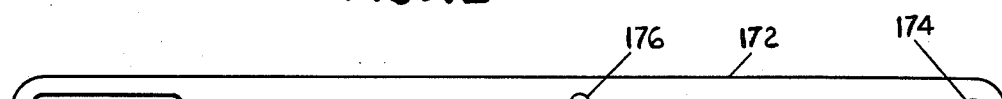
FIG. 13 depicts a plan view of a steering bar utilized in the sled arrangement depicted in FIG. 1.
Figure 14:
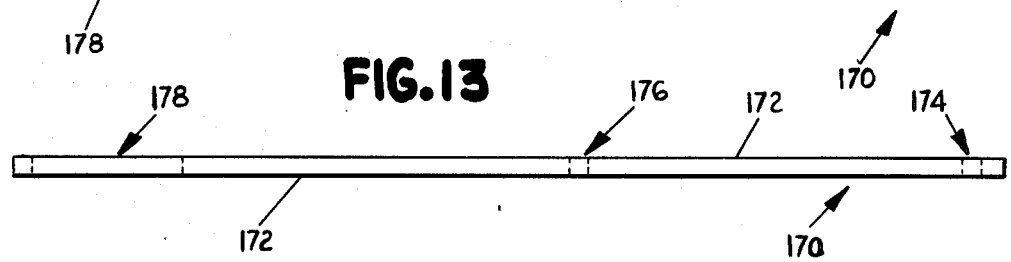
FIG. 14 depicts a side view of the steering bar depicted in FIG. 13.
Figure 15:
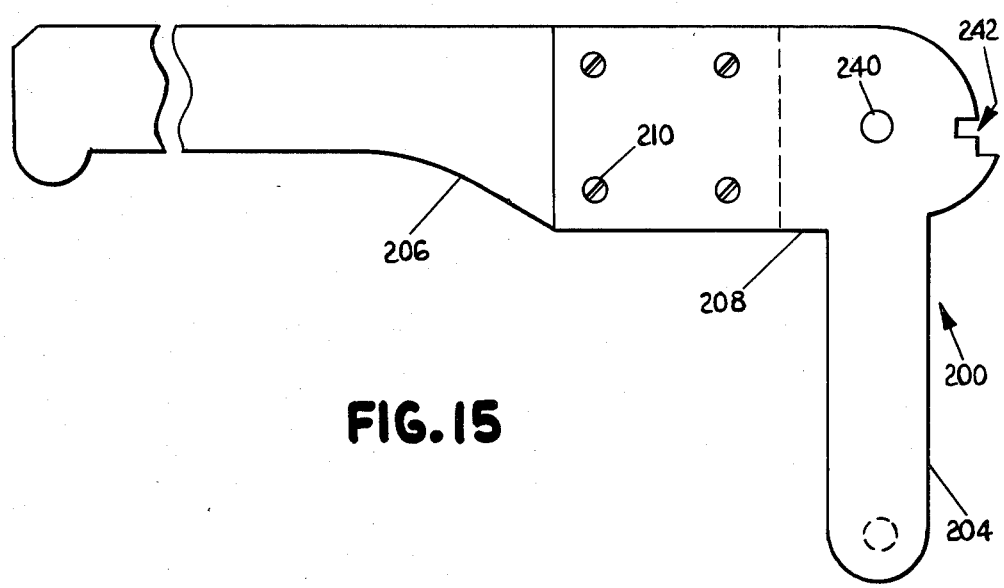
FIG. 15 depicts a plan view of a left-hand steering handlebar of the sled arrangement depicted in FIG. 1.
Figure 16:
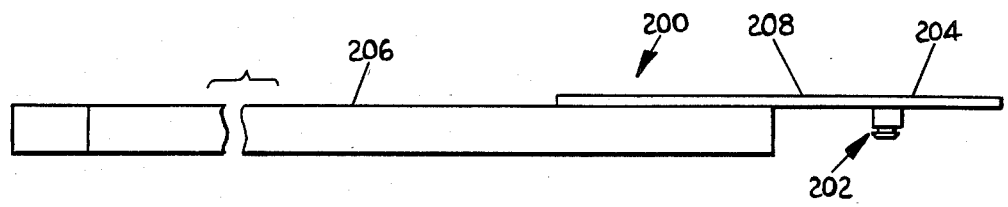
FIG. 16 depicts a side view of the left-hand steering handlebar depicted in FIG. 15.

As depicted perspectively in FIG. 1, the steering assembly further comprises a pair of steering rods 160 which are connected between the steering brackets 150 and a pair of steering bars subsequently described herein. A side view of one of the steering rods 160 for the steering bracket 150 connected to the right-hand ski 110 is depicted in FIG. 12. In accordance therewith, the steering rod 160 comprises a conventional steering knuckle bolt assembly 162 which provides a rotationally pivotable connection to an elongated rod portion 164 of the rod arrangement 160. The elongated rod 164 terminates in a right-hand portion 166 having a snap ring groove arrangement 168 at the termination thereof.

The steering rod 160 for the steering bracket 150 connected to the right-hand ski 110 is connected by means of a snap ring assembly 168 to one of a pair of steering bars 170 depicted perspectively in FIG. 1. Details of one of the steering bars 170 is shown in the plan view of the bar depicted in FIG. 13 and the side view of the bar 170 depicted in FIG. 14. As shown therein, the bar 170 comprises an elongated portion 172 having an aperture 174 at one end thereof in which to receive the snap ring groove assembly 168 of the steering rod 160. Near the center portion of each of the bars 170 is an additional aperture 176 which is utilized to connect each of the steering bars 170 in a rotational pivotal arrangement to the base portion 104 of sled platform 102 by means such as the bolt 177 depicted in the sectional view of FIG. 3 or by other suitable pivotal connection means.

At the other end of each of the steering bars 170 opposing the end having the aperture 174 is a centered elongated slot arrangement 178 which is utilized in combination with the steering handle assembly subsequently described herein. As depicted in the perspective view of FIG. 1 and the sectional view of FIG. 3, the steering bars 170 actually comprise a right-hand ski steering bar 180 and a left-hand ski steering bar 182 vertically disposed thereabove. The right-hand steering bar 180 is connected to the steering rod 160 associated with right-hand ski 110 as previously described herein. Correspondingly, the left-hand steering bar 182 vertically disposed above bar 180 is connected to a steering rod 160 associated with the left-hand ski 109. It should also be noted that the centered pivotal connection of each of the steering bars 170 to the sled platform 102 by means of bolt 177 includes a spacer 184 to provide spacing between the platform 102 and each of the bars 170.

The steering handle assembly manually manipulable by a sled rider and the assembly's connection to the steering bars 170 will now be described with respect to FIGS. 1–5 and 15–18. The steering bar 182 associated with the left-hand ski 109 is connected at its end comprising slot 178 to a left-hand steering handle 200 depicted in detail in the top and side views of FIGS. 15 and 16, respectively. As depicted therein, the left steering handle assembly 200 comprises a snap ring arrangement 202 which is receivable within the slot 178 of steering bar 182. The snap ring groove assembly 202 is vertically disposed and connected at its upper portion to an elongated section 204. The elongated section 204 is connected integrally in a perpendicular manner to an additional section 208 which is, in turn, connected by means of screws 210 or other suitable means to an elongated handle portion 206. The peripheral configurations of the previously described portions of the left steering handle 200 are apparent from the plan view of FIG. 15. The snap ring groove 202 is received within the elongated slot 178 of the steering bar 182 in a manner so as to allow pivotal movement of the handle 200 relative to the bar 182.

Figure 17:
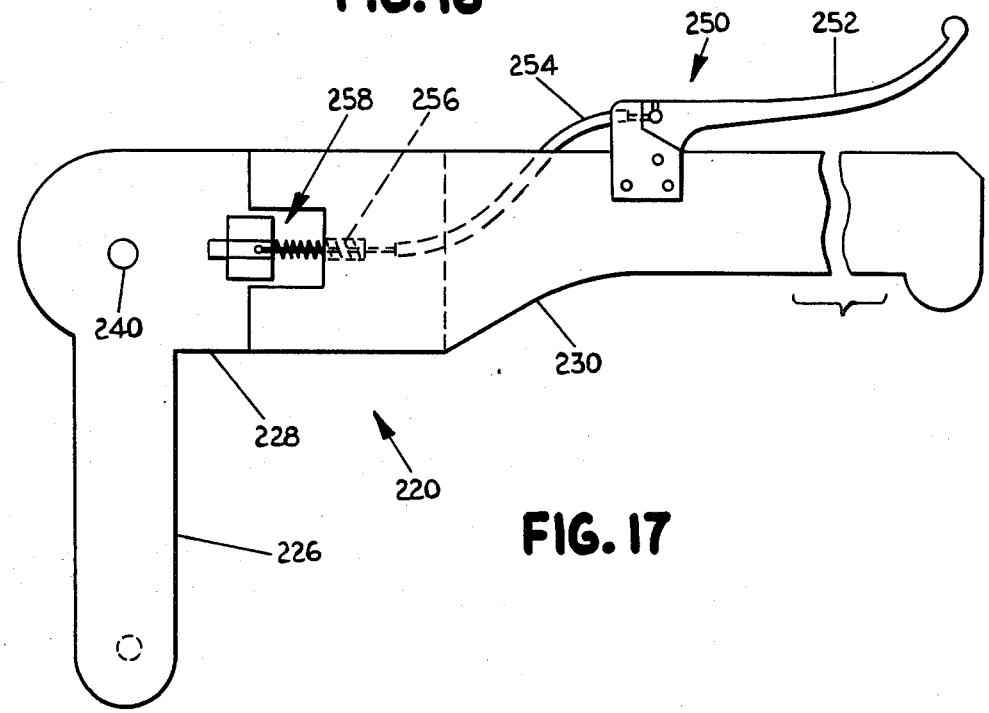
FIG. 17 depicts a plan view of a right-hand steering handlebar of the sled arrangement depicted in FIG. 1.
Figure 18:
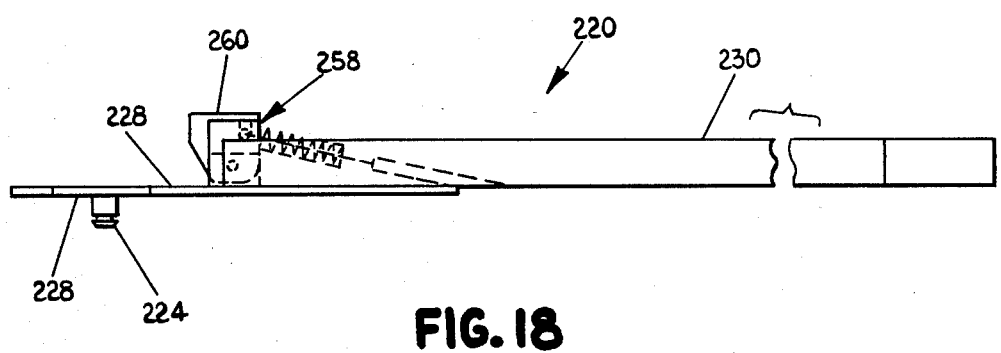
FIG. 18 depicts a side view of the right-hand steering handlebar depicted in FIG. 17.

Shaped in a manner similar to the left steering handle 200 but configured in a mirror image thereof is a right steering handle assembly 220 depicted in perspective view in FIG. 1 and in detailed plan and side views of FIGS. 17 and 18, respectively. Similar to the left steering handle assembly 200, the right steering handle assembly 220 also comprises a snap ring groove arrangement 224 which is received in the elongated slot 178 of the steering bar 180 associated with the right-hand ski 110. The snap ring 224 is vertically disposed and terminates at the lower surface of an elongated portion 226 which is integrally connected to a perpendicular and horizontally disposed portion 228. Portion 228 is, in turn, connected by means of screws or other suitable connecting means to an elongated handle portion 230.

At the junctions between the portions 208 and 204 of left-hand steering assembly 200 and the portions 228 and 226 of right-hand steering assembly 220 are apertures 240 which are centered so as the left-hand steering assembly 200 is vertically disposed above the right-hand steering assembly 220 and are connected with suitable washers and spacer means through a bolt or other suitable connecting means which provide pivotal movement of the assemblies 200 and 220 relative to each other. In addition, the left-hand steering assembly 200 contains a notch arrangement 242 which provides a means subsequently described herein to lock the steering handles 200 and 220 together when each of the handle portions 206 and 230 are aligned in equivalent transverse axes.

As depicted in FIGS. 17 and 18, the right-hand steering assembly 220 also comprises a locking mechanism 250 which comprises a manually manipulable locking handle 252 attached by connecting means to the elongated portion 230 of assembly 220. Attached to the locking handle 252 and its connection to the elongated portion 230 is a cable assembly 254 which is, in turn, attached to a spring lock arrangement 256. The spring lock arrangement 256 is, in turn, connected to a locking bracket mechanism 258 utilized to operate a lock 260 which proves a means to lock the steering handle assemblies 200 and 220 together by the cooperation of lock 260 with the notch arrangement 242 of the left-hand steering assembly 200. The sled rider can utilize the locking handle 252 and manipulation of the steering handle assemblies 200 and 220 to selectively lock the assemblies together or unlock the assemblies together so that the handle assemblies 200 and 220 operate in an independent manner.

Figure 5:
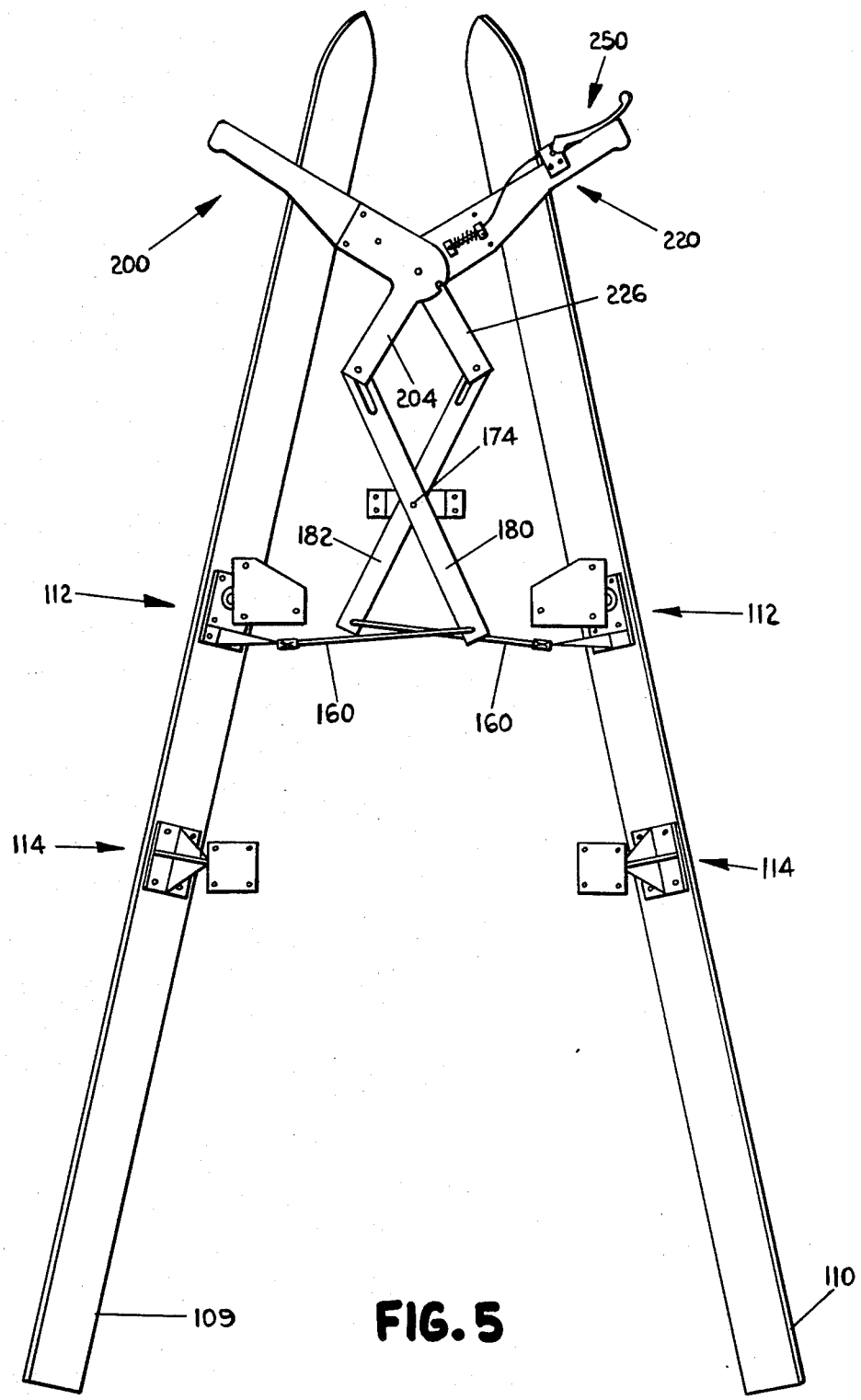
FIG. 5 is a plan view of the sled arrangement depicted in FIG. 1 with the platform shown in dotted lines and the sled in a "snow plow" configuration to effect braking.

Operation of the sled arrangement 100 in accordance with the invention will now be described with respect to the drawings previously described herein and specifically with respect to FIGS. 4 and 5 showing turning and braking operations, respectively. With the steering assemblies 200 and 220 aligned and locked together as previously described herein, the rider can initiate a "left turn" by pulling rearward on the left handle assembly 200 or, alternatively, exerting a forward force on the right steering handle assembly 220. It should be emphasized that applying a forward force is advantageous in that application of forces directionally in accordance with inertial momentum provides greater control of operation and tends to decrease the inertial tendency of the rider to move forward on the platform.

The manually exerted force causes the elongated portions 204 and 226 of the steering handle assemblies 200 and 220, respectively, to pivotally rotate relative to the steering bar arrangements 180 and 182. It should be noted that the bar arrangements 180 and 182, in this instance with the handle assemblies 220 and 200 locked together in alignment, will also remain aligned during the turning operation. The bar assemblies 180 and 182 are then caused by the translated external forces on the same to pivot with respect to the sled platform 102 about a vertical axis extending through the apertures 174 which comprise the pivot center point for the bar assembly 170.

The pivotal rotation of the bar assemblies 170 will, in turn, exert forces on the steering rod assemblies 160 so as to cause the skis 109 and 110 to remain in a parallel relationship but to turn in a manner so as to effectuate a "left-hand" turn. A plan view of this alignment is depicted in FIG. 4. As apparent from experimentation of a sled arrangement 100 in accordance with the invention, the skis 109 and 110 are also made to pivot about rotational axes defined by the pivot centers through the ball and socket arrangements previously described herein. Specifically, the pivot centers of the forward and rear support assemblies 112 and 114, respectively, will cause the skis 109 and 110 to "tilt" and to simultaneously turn in a manner so as to effectuate a left turn. Advantageously, and in accordance with the invention, the simultaneous pivotal movement of both skis 108 precludes the situation where one ski is actually opposing the turning operation.

Alternatively, the sled rider can utilize the previously described locking arrangement 250 to "unlock" the steering assemblies 200 and 220 relative to each other and to effectuate a braking configuration by exerting a forward force on each of the handle assemblies 200 and 220. With the assemblies 200 and 220 unlocked relative to each other, the elongated portions 204 and 226 each rotate laterally outward from each other in a transverse manner as specifically depicted in FIG. 5. This pivotal rotation of the elongated portions 204 and 226 translates into corresponding pivotal movement of the steering bar assemblies 180 and 182 in a manner so as to form a "cross bar" configuration relative to their pivot centers through apertures 174. This pivotal movement of the steering bar assemblies 170 causes the steering rod assembly 160 associated with the right-hand ski 110 to exert a "pulling" force on the steering bracket 150 connected to the right-hand ski 110. With the steering bracket 150 adjacent the forward support assembly 112, the forward support assembly 112 being forward of the longitudinal midpoint of the right-hand ski 110, and the rear support assembly 114 being rearward of the same midpoint, the forward portion of the ski 110 is made to turn inwardly while the rear portion of ski 110 turns in an outward manner. Through the ball and socket arrangements previously described with respect to the support assemblies 112 and 114, the right-hand ski 110 also rotates about a longitudinal axis directional with the ski parallel to horizontal disposition of the sled platform 102 so that the inward edge of ski 110 is made to "dig in" to the snow and the ski 110 is tilted so as to effectuate a commonly known "snow plow" arrangement. Correspondingly, the left-hand ski 109 is made to operate in a similar manner but to be configured in a mirror image with respect to the configuration of right-hand ski 110.

As previously discussed, the ability to effect a braking operation by application of forward forces on the handle assemblies 200 and 220 is advantageous in that these forces are applied in the direction of sled momentum. Accordingly, the sled rider does not have an inertial tendency to move forward on platform 102 in a direction opposing the direction of the forces on assemblies 200 and 220. The forward application of forces thus provides better control of both body position and the sled arrangement 110, in general.

It should be noted that the operation of the skis 109 and 110 by means of manipulation of the steering assemblies 200 and 220 by the sled rider provide a means to effectuate turning and braking operations in a manner similar to that utilized and commonly known to the skilled skier. That is, the skis 109 and 110 operate for a turning arrangement in a manner similar to that in which a person would operate skis without the use of a sled arrangement, i.e. simultaneous turning operations. Furthermore, the operation is similar to that utilized by the skilled skier to effectuate a braking or snow plow arrangement. In accordance with the invention, these operations are advantageously performed by means of the forward support assemblies 112 having the previously described ball and socket arrangements adjacent to the skis 108 so that the pivot centers of these assemblies are below a midpoint of the vertical disposition of the sled platform 102 relative to the skis 108. Correspondingly, in accordance with the invention, the rear bracket assemblies 114 comprise the previously described ball and socket arrangements adjacent to the sled platform 102 in a manner so that the pivot centers of these assemblies are above a midpoint between the vertical disposition of the sled platform 102 relative to the skis 108.

It should further be noted that the particular support assemblies and steering arrangements are not meant to be an exhaustive enumeration of the particular arrangements which can be utilized in accordance with the invention. Accordingly, it will be apparent to those skilled in the pertinent art that modifications and variations of the above-described illustrative embodiments of the invention can be effected without departing from the spirt and scope of the novel concepts of the invention.

The embodiments of the invention in which an exclusive property or privilege is claimed are defined as follows:

1. A slalom sled arrangement for use by a sled rider and adapted to be controllable by said rider for turning and braking operations, said sled arrangement comprising:

platform means for providing a positioning location for said sled rider;

ski means mounted beneath said platform means for providing sliding surfaces to said sled arrangement and traversing through snow by gravitational effects, said ski means comprising a pair of skis each mounted on opposing lateral sides of said sled arrangement;

forward support means connecting said platform means and said ski means for supporting said platform means above said ski means at a position forward of a longitudinal midpoint of said ski means;

rear support means connecting said platform means and said ski means for providing additional vertical support of said platform means above said ski means at a position rearward of said longitudinal midpoint of said ski means and a longitudinal midpoint of said platform means;

steering means connected to said ski means for manually controlling direction and braking of said sled arrangement by said rider;

said forward support means comprising first pivot means and first rigid portions interconnecting said first pivot means and said platform means, wherein said first pivot means provides pivotal movement and conical rotation of front portions of each of said skis through a vertical axis extending upward from each ski relative to said platform means, and wherein said first pivot means comprises a first single pivot center on each axis below a vertical midpoint between said platform means and said ski means, with each of said skis effecting both tilting and turning movements at said first single pivot centers relative to said first rigid positions; and said rear support means comprising second pivot means and second rigid portions interconnecting said second pivot means and said ski means, wherein said second pivot means provides pivotal movement and conical rotation of rear portions of each of said skis through an additional vertical axis extending upward from each ski relative to said platform means, and wherein said second pivot means comprises a second single pivot center on each additional axis above a vertical midpoint between said platform means and said ski means, with said second rigid portions effecting both tilting and turning movements at said second single pivot centers relative to said platform means, and further wherein the vertical offset of said first and second pivot centers associated with one of said skis allows said one ski to turn relative to a normal longitudinal axis of said one ski while simultaneously tilting at said first and second pivot centers in response to forces applied on said steering means by said sled rider.

2. A slalom sled arrangement in accordance with claim 1 characterized in that
   said steering means comprises means controllable by said rider for causing simultaneous pivotal movement of said skis during a turning operation by said rider.

3. A slalom sled arrangement in accordance with claim 2 characterized in that:
   said forward support means comprises a pair of forward bracket assemblies, each associated with one of said pair of skis;
   said rear support means comprises a pair of rear bracket assemblies, each associated with one of said pair of skis; and
   corresponding ones of said forward and rear bracket assemblies associated with one of said pair of skis are configured in a mirror image of the others of said forward and rear bracket assemblies associated with the other one of said pair of skis.

4. A slalom sled arrangement in accordance with claim 3 characterized in that:
   said steering bracket means comprises a pair of vertically disposed steering brackets, each of said steering brackets mounted to one of said pair of skis;

said linkage means comprises a pair of transversely and horizontally mounted steering rods, each of said steering rods being connected to one of said steering brackets; and said linkage means further comprises a pair of steering bars pivotally connected to said platform means at a pivot center, wherein said pivot center also provides a pivotal rotation of each of said steering bars, and further wherein each of said steering bars is pivotally connected to one of said steering rods.

5. A slalom sled arrangement in accordance with claim 4 characterized in that said control means comprises a pair of steering handles, each of said steering handles being connected to a corresponding one of said steering bars in a pivotal connection and each of said steering handles being connected to the other of said steering handles in a pivotal connection which can be selectively positioned in a locked or unlocked arrangement.

6. A slalom sled arrangement in accordance with claim 5 characterized in that manipulation of said steering handles to an unlocked configuration by said sled rider allows pivotal rotation about a vertical axis of one of said steering handles with respect to another one of said steering handles and further provides for transverse lateral movement of said pivotal connection of one of said steering handles to a corresponding one of said steering bars relative to said pivotal connection of the other of said steering handles to the other of said steering bars.

7. A slalom sled arrangement in accordance with claim 6 characterized in that manipulation of the steering handles to an unlocked configuration by said sled rider allows for lateral and transverse movement of the pivotal connection between one of said steering bars and a corresponding one of said steering rods realtive to the pivotal connection between the other of said steering bars and the corresponding other of said steering rods.

8. A slalom sled arrangement in accordance with claim 2 characterized in that said steering means comprises:
control means manually manipulable by said sled rider and connected to said platform means for controlling directional guidance and braking operations of said sled arrangement;
linkage means connected to said control means and positioned beneath said platform means for translating forces exerted by said sled rider on said control means to said ski means; and
steering bracket means mounted on said ski means and connected to said linkage means for imparting forces to said ski means, thereby causing rotational movement of said ski means relative to said platform means through said first and second pivot means.

9. A slalom sled arrangement in accordance with claim 8 characterized in that:
said steering means comprises a pair of steering brackets, each one of said pair of steering brackets being selectively connected to one of said pair of skis; and
said linkage means comprises steering rod means selectively connected to each of said steering brackets and adapted to impart pulling and pushing forces on each of said skis, thereby providing rotational translation of said skis about said first and second pivot means.

10. A slalom sled arrangement in accordance with claim 9 characterized in that said linkage means further comprises:
steering bar means normally positioned in a longitudinal direction parallel to said pair of skis and connected between said steering rod means and said control means; and
said steering bar means is connected to said platform means in a pivotal manner so as to provide partial rotation about a vertical axis, said pivotal connection of said steering bar means to said platform means being between connection of said steering bar means to said control means.

11. A slalom sled arrangement in accordance with claim 10 characterized in that said control means comprises a pair of steering handles pivotally connected to said platform means, each of said steering handles having means for selective connection to the other of said steering handles in a locked or unlocked configuration.

12. A slalom sled arrangement in accordance with claim 11 characterized in that said control means further comprises locking means connected to one of said steering handles for providing to said sled rider selective connection of said steering handles in a locked or unlocked configuration.

13. A slalom sled arrangement in accordance with claim 11 characterized in that manipulation of said steering handles by the sled rider to an unlocked configuration and an exertion of forces by said sled rider so as to move each of said steering handles in a forward direction causes each of said pair of skis to be turned inwardly and partially tilted about said first and second pivot means through longitudinal axes so as to effectuate a braking operation.

14. A slalom sled arrangement in accordance with claim 13 characterized in that manipulation of said steering handles by said rider to a locked configuration causes each of said pair of skis to rotate about said first and second pivot means in a manner so as to turn said sled arrangement and maintain each one of said pair of skis in a parallel relationship relative to the other of said pair of skis.

15. A slalom sled arrangement in accordance with claim 1 characterized in that
said forward support means comprises a pair of forward bracket assemblies vertically disposed between said ski means and said platform means, wherein each of said bracket assemblies is mounted between one of said pair of skis and said platform means.

16. A slalom sled arrangement in accordance with claim 15 characterized in that said first pivot means comprises a pair of ball and socket assemblies, each mounted within one of said pair of forward bracket assemblies for providing a pivot center and conical rotation of each of said skis relative to said platform means.

17. A slalom sled arrangement in accordance with claim 15 characterized in that each of said forward bracket assemblies comprises:
a lower base portion mounted by connecting means to the upper surface of an associated one of said pair of skis, wherein said lower base portion includes a portion forming a socket configuration;
a ball receivable into said socket configuration and rotationally pivotable with respect thereto and whereby said ball and socket configuration forms at least a portion of said first pivot means;

a cylindrical rod portion integrally connected to the upper portion of said ball and vertically disposed with respect thereto;

a vertically disposed bracket support section integrally connected to said cylindrical rod portion and comprising a triangularly shaped section having radially extending portions extending angularly upward therefrom;

a horizontally disposed upper bracket laterally offset inwardly from said lower base portion and connected to the lower surface of said platform means.

18. A slalom sled arrangement in accordance with claim 1 characterized in that said rear support means comprises a pair of rear bracket assemblies vertically disposed between said ski means and said platform means, wherein each of said rear bracket assemblies is mounted between one of said skis and said platform means.

19. A slalom sled arrangement in accordance with claim 18 characterized in that said second pivot means comprises a pair of ball and socket assemblies each mounted within one of said pair of rear bracket assemblies for providing a pivot center and conical rotation relative to said platform means.

20. A slalom sled arrangement in accordance with claim 18 characterized in that each of said rear bracket assemblies comprises:

a horizontally disposed base portion mounted by connecting means to the upper surface of an associated one of said pair of skis;

a vertical portion integrally connected to said base portion and comprising radially extending flanges at relative angles of 90° with respect to adjacent ones of said flange and formed whereby two of said flanges are in a plane formed along a longitudinal axis of the associated one of said pair of skis perpendicular with respect to the upper surface of the ski;

a cylindrical portion integrally connected to an apex formed by said flanges and vertically extending upward therefrom;

a ball integrally connected to said cylindrical portion at the upper termination thereof;

an upper bracket portion having a socket configuration extending downwardly and connected to the lower surface of said platform means, wherein said ball is journalled into said socket configuration and forms a ball and socket arrangement included within said second pivot means.

* * * * *